(12) United States Patent
Katsumata et al.

(10) Patent No.: US 6,973,836 B2
(45) Date of Patent: Dec. 13, 2005

(54) SEMICONDUCTOR PRESSURE SENSOR HAVING DIAPHRAGM

(75) Inventors: Takashi Katsumata, Kariya (JP); Inao Toyoda, Anjo (JP); Hiroaki Tanaka, Kariya (JP)

(73) Assignee: Denso Corporation, Kariya (JP)

( * ) Notice: Subject to any disclaimer, the term of this patent is extended or adjusted under 35 U.S.C. 154(b) by 90 days.

(21) Appl. No.: 10/785,980

(22) Filed: Feb. 26, 2004

(65) Prior Publication Data

US 2004/0173027 A1    Sep. 9, 2004

(30) Foreign Application Priority Data

Mar. 7, 2003  (JP) .............................. 2003-061584

(51) Int. Cl.[7] .............................................. G01L 9/00
(52) U.S. Cl. ............................. 73/754; 73/715; 73/719
(58) Field of Search ................................ 73/700–756

(56) References Cited

U.S. PATENT DOCUMENTS

| | | | |
|---|---|---|---|
| 4,777,826 A * | 10/1988 | Rud, Jr. et al. ............... | 73/708 |
| 4,813,272 A * | 3/1989 | Miyazaki et al. ............. | 73/708 |
| 5,097,841 A * | 3/1992 | Moriuchi et al. ............. | 600/488 |
| 5,167,158 A * | 12/1992 | Kamachi et al. .............. | 73/727 |
| 5,191,798 A * | 3/1993 | Tabata et al. .................. | 73/727 |
| 5,253,532 A * | 10/1993 | Kamens ........................ | 73/708 |
| 5,289,721 A * | 3/1994 | Tanizawa et al. ............. | 73/727 |
| 5,343,755 A * | 9/1994 | Huss .............................. | 73/708 |
| 5,419,199 A * | 5/1995 | Araki ............................ | 73/708 |
| 6,422,088 B1 * | 7/2002 | Oba et al. ...................... | 73/754 |
| 6,595,065 B2 | 7/2003 | Tanizawa et al. | |
| 6,601,452 B2 | 8/2003 | Murata et al. | |

* cited by examiner

*Primary Examiner*—Edward Lefkowitz
*Assistant Examiner*—Jermaine Jenkins
(74) *Attorney, Agent, or Firm*—Posz Law Group, PLC

(57) ABSTRACT

A semiconductor pressure sensor includes a semiconductor substrate having a diaphragm for receiving pressure and a bridge circuit for detecting a distortion of the diaphragm corresponding to the pressure. The bridge circuit includes a pair of first gauge resistors and a pair of second gauge resistors. The first gauge resistors are disposed on a center of the diaphragm, and the second gauge resistors are disposed on a periphery of the diaphragm. Each first gauge resistor has a first resistance, which is larger than a second resistance of each second gauge resistor. The TNO property of the sensor is improved, so that the sensor has high detection accuracy.

12 Claims, 3 Drawing Sheets

SEMICONDUCTOR PRESSURE SENSOR HAVING DIAPHRAGM

CROSS REFERENCE TO RELATED APPLICATION

This application is based on Japanese Patent Application No. 2003-61584 filed on Mar. 7, 2003, the disclosure of which is incorporated herein by reference.

FIELD OF THE INVENTION

The present invention relates to a semiconductor pressure sensor having a diaphragm.

BACKGROUND OF THE INVENTION

A semiconductor pressure sensor having a diaphragm (i.e., a diaphragm type semiconductor pressure sensor) includes a diaphragm and a strain gauge resistor. Both of the diaphragm and the strain gauge resistor are formed on a semiconductor substrate for detecting pressure. The substrate has a principal plane of (110) crystalline plane (i.e., a (110) plane). This pressure sensor is disclosed, for example, in Japanese Unexamined Patent Application Publication No. 2001-356061 (i.e., U.S. Pat. No. 6,601,452). Specifically, the diaphragm is formed on the principal plane of the substrate, and detects pressure. The strain gauge resistor is formed on the diaphragm, and provides a bridge circuit for outputting a detected signal corresponding to a distortion of the diaphragm.

Here, another pressure sensor having a pair of center gauge resistors and a pair of side gauge resistors is disclosed in Japanese Unexamined Patent Application Publication No. H11-94666 (i.e., U.S. Pat. No. 6,595,065). In this sensor, the strain gauge resistors, i.e., the center gauge and side gauge resistors, are disposed on the (110) plane of the substrate. The center gauge resistors are disposed on the center of the diaphragm, and disposed along with a <110> crystalline axis (i.e., a <110> axis). The side gauge resistors are disposed on a periphery of the diaphragm.

In the above sensors, a glass base is bonded to the substrate with using an anodic bonding method and the like. The thermal expansion coefficient of the substrate is different from that of the glass base. Therefore, when temperature around the sensor changes, a thermal stress is generated between the substrate and the glass base. The thermal stress may distort the diaphragm, so that resistance of each resistor disposed on the diaphragm is changed in proportion to the distortion. The thermal stress applied to each resistor is different each other since the resistor is disposed on a different position on the diaphragm. Specifically, the thermal stress applied to each center gauge resistor is different from the thermal stress applied to each side gauge resistor. Thus, a difference between the thermal stress applied to the center gauge resistor and the thermal stress applied to the side gauge resistor provides a detection error as a noise. Further, the difference of the thermal stress changes nonlinearly in relation to the temperature, so that the temperature dependence of offset of the output voltage has a certain curvature in relation to the temperature. Therefore, in the temperature dependence of the offset of the output voltage, a slope of the offset of the output voltage in relation to the temperature between a room temperature and a certain high-temperature is different from that between a certain lower temperature and the room temperature. This difference of the slope is called as a temperature nonlinearity offset (i.e., TNO) property. The TNO property is a property of the offset of the output voltage having nonlinearity in relation to the temperature. The TNO property is one of the most important factors for deciding an accuracy of the sensor.

Further, when the pressure sensor is minimized in size, i.e., the substrate is minimized, it is considered that the diaphragm is required to be minimized. That is because the diaphragm constitutes a large area in the sensor. In this case, the difference of the thermal stress between the center gauge resistors and the side gauge resistors becomes larger, so that the detection error becomes larger. Thus, as the diaphragm becomes smaller, the TNO property becomes worse, i.e., the difference of the slope becomes larger. Therefore, it is difficult to minimize the sensor without deteriorating the TNO property.

SUMMARY OF THE INVENTION

In view of the above-mentioned problems, it is an object of the present invention to provide a semiconductor pressure sensor having high detection accuracy.

A semiconductor pressure sensor includes a semiconductor substrate having a diaphragm for receiving pressure and a bridge circuit for detecting distortion of the diaphragm corresponding to the pressure. The bridge circuit includes a pair of first gauge resistors and a pair of second gauge resistors. The first gauge resistors are disposed on a center of the diaphragm, and the second gauge resistors are disposed on a periphery of the diaphragm. Each first gauge resistor has a first resistance, which is larger than a second resistance of each second gauge resistor.

In the above sensor, although the thermal stress applied to the first gauge resistor is different from that applied to the second gauge resistor in a case where the thermal stress is applied to the sensor, a detection error corresponding to the difference between the thermal stresses is compensated by controlling the resistances of the center and side gauge resistors. Therefore, the sensor has high detection accuracy.

Preferably, the bridge circuit has a predetermined ratio of resistance between the second resistance and the first resistance, and the diaphragm has another predetermined ratio of thermal stress between a second thermal stress to be applied to the second gauge resistor and a first thermal stress to be applied to the first gauge resistor in a case where a thermal stress is applied to the substrate. The predetermined ratio of resistance is equal to the predetermined ratio of thermal stress.

More preferably, the first gauge resistors and the second gauge resistors are connected together in series so that the bridge circuit provides a wheatstone bridge. Each second gauge resistor further includes a third gauge resistor having a third resistance and disposed on the periphery of the diaphragm. The second and third gauge resistors are integrally connected in series so that the second and third gauge resistors provide one gauge resistor. The first resistance is equal to a total resistance of the second and third resistances. In this case, the TNO property of the sensor is improved, so that the offset voltage of the bridge circuit becomes null easily in a case where the pressure is not applied to the sensor. Thus, a fine resistance change corresponding to a fine pressure applied to the sensor can be detected, so that the sensor has much high detection accuracy.

Preferably, the semiconductor substrate is made of single crystal silicon having a principal plane of a (110) crystal plane. The first gauge resistor has a longitudinal direction along with a <110> crystal axis of the single crystal silicon, the second gauge resistor has a longitudinal direction along with the <110> crystal axis of the single crystal silicon, and the third gauge resistor has a longitudinal direction along with a <100> crystal axis of the single crystal silicon. More preferably, each gauge resistor has a folded structure of a wire resistor so that the wire resistor is parallel to the <110> crystal axis or the <100> crystal axis, and the diaphragm has an octagonal shape having a pair of sides along with the <110> crystal axis, a pair of sides along with the <100> crystal axis, and four sides for connecting between the side along with the <110> crystal axis and the side along with the <100> crystal axis.

Preferably, the sensor further includes a concavity disposed in the substrate so as to provide the diaphragm; and a glass base disposed on the substrate. The substrate includes a first surface and a second surface. The gauge resistors are disposed on the first surface of the substrate, and the glass base is attached to the second surface of the substrate so as to provide a chamber between the glass base and the concavity. More preferably, the chamber is sealed so that the sensor provides an absolute pressure sensor, and the gauge resistors are strain gauge resistors made of diffused resistor.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENT

Figure 4:
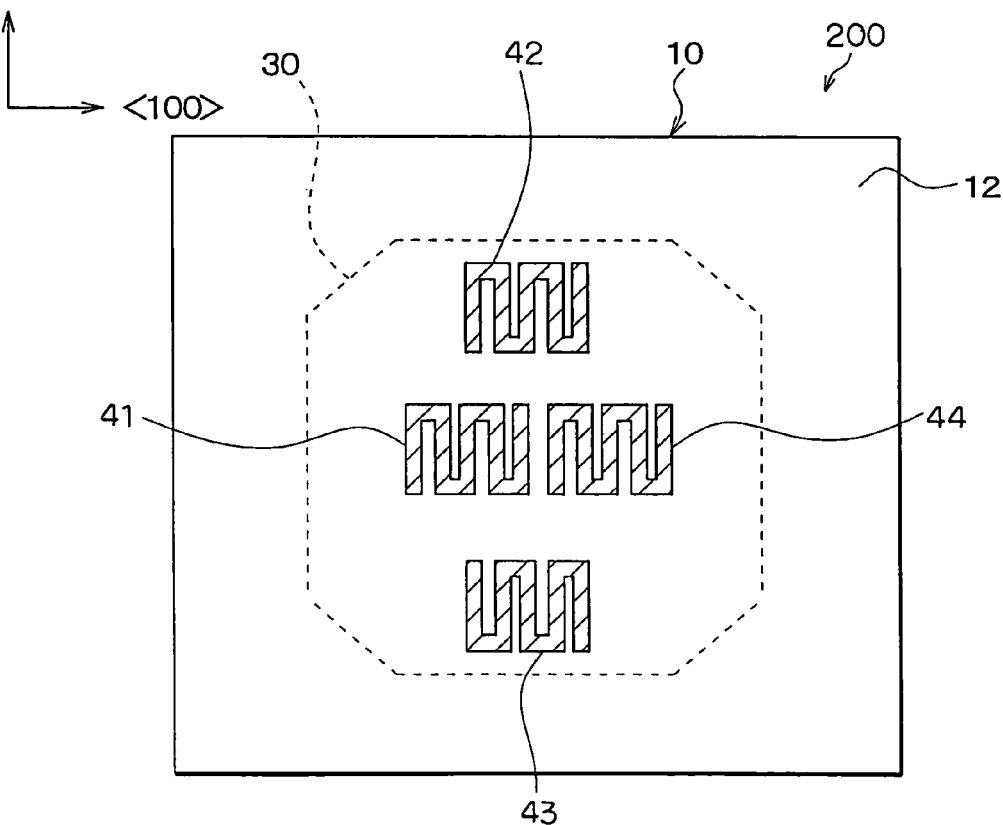
FIG. 4 is a plan view showing a semiconductor sensor according to a comparison of the preferred embodiment.

The inventors have preliminarily studied about a diaphragm type semiconductor pressure sensor 200 as a comparison, as shown in FIG. 4. The pressure sensor 200 includes a semiconductor substrate 10, a diaphragm 30, and multiple strain gauge resistors 41–44. The diaphragm 30 is formed on a principal plane of the substrate 10. The resistors 41–44 are disposed on the diaphragm 30. The principal plane of the substrate 10 is a (110) crystalline plane (i.e., a (110) plane), which is a crystalline plane of single crystal silicon having a <110> crystalline axis (i.e., a <110> axis) and a <100> crystalline axis (i.e., a <100> axis). The <110> axis and the <100> axis are a pair of crystalline axes, which are at right angles each other, i.e., the <110> axis is perpendicular to the <100> axis.

Sensitivity in case of a stress generated along with the <110> axis is higher than sensitivity in case of a stress generated along with the <100> axis. Namely, the stress parallel to the <110> axis is detected sensitively compared with the stress parallel to the <100> axis. That is because coefficient of piezoelectric resistance along with the <110> axis is much larger than that along with the <100> axis. Therefore, when a distortion in the diaphragm having the (110) plane is measured so that pressure applied to the diaphragm is detected, it is preferred that the distortion is measured with using the stress along with the <110> axis, not the <100>.

The (110) plan has only one <110> axis, i.e., one <110> direction. Therefore, the resistors 41–44 are required to have a certain arrangement shown in FIG. 4 so that the detected signal becomes larger, i.e., the output corresponding to the distortion becomes larger. The arrangement shown in FIG. 4 is determined such that the stress along with the <110> axis can be detected at high sensitivity, compared with the stress along with the <100> axis. Specifically, the arrangement is such that a pair of center gauge resistors 41, 44 is disposed on almost a center of the diaphragm 30, and a pair of side gauge resistors 42, 43 is disposed on a periphery of the diaphragm 30. Each resistor 41–44 is mainly disposed along with the <110> axis. Here, the center gauge resistors 41, 44 are disposed near the center, and the side gauge resistors 42, 43 are disposed on the periphery, compared with the center gauge resistors 41, 44. A longitudinal direction of the resistor 41–44 is mainly parallel to the <110> axis of the substrate 10.

Figure 5:
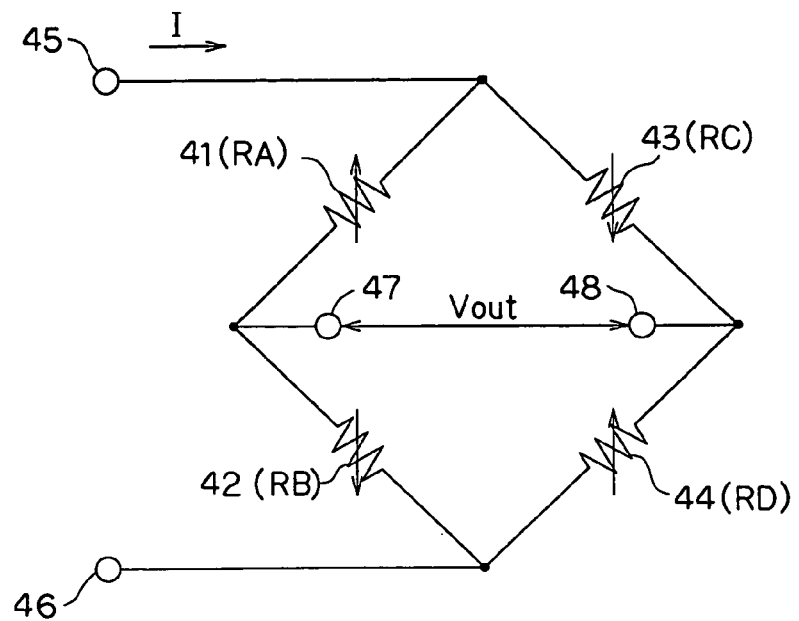
FIG. 5 is a circuit diagram showing a bridge circuit of the sensor according to the comparison.

The four gauges provide a bridge circuit for detecting the stress generated along with the <110> axis. Specifically, the bridge circuit becomes a wheatstone bridge, as shown in FIG. 5. The wheatstone bridge includes the resistors 41–44. One of the center gauge resistor 41 has a resistance of RA, and the other center gauge resistor 44 has a resistor of RD. One of the side gauge resistor 42 has a resistance of RB, and the other side gauge resistor 43 has a resistor of RC. These resistors 41–44 are connected together in series so that the resistors provide a rectangle-shaped closed circuit. Thus, the wheatstione bridge is provided.

In the bridge circuit, a pair of input terminals 45, 46 are connected to the bridge circuit so that direct current electricity is applied to the bridge circuit. The direct current I flows between the terminals 45, 46. At this time, when the diaphragm 30 is distorted with the pressure, the resistances RA, RB, RC, RD are changed in accordance with the distortion of the diaphragm 30. Therefore, a midpoint potential Vout between a pair of output terminals 47, 48 is generated. The midpoint potential Vout corresponds to the distortion of the diaphragm 30, i.e., the pressure, so that a detected signal as the midpoint potential Vout is outputted from the output terminals 47, 48.

Figure 6A:
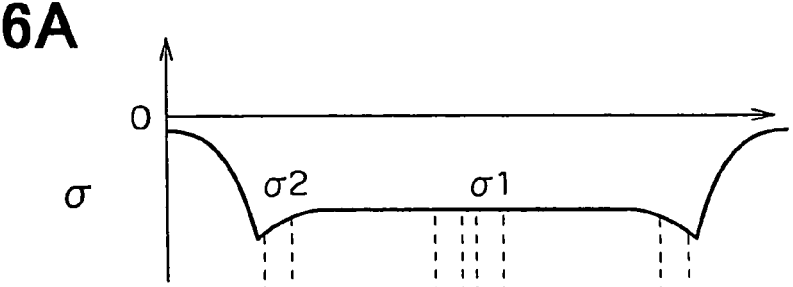
FIG. 6A is a relationship between a thermal stress and a position in the sensor according to the comparison.
Figure 6B:
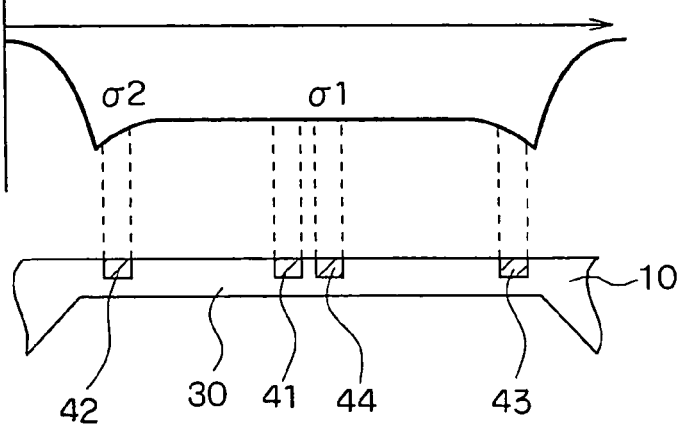
FIG. 6B is a cross-sectional view showing the sensor according to the comparison.

In the above sensor 200, the thermal stress applied to the substrate 10, i.e., the diaphragm 30 is analyzed with using a finite element method (i.e., FEM). Specifically, the thermal stress applied to the center gauge and the side gauge resistors is calculated. FIG. 6 shows a result of a calculation of the thermal stress σ on the substrate 10. The thermal stress σ1 applied to the center gauge resistors 41, 44 disposed on the center of the diaphragm 30 is smaller than the thermal stress σ2 applied to the side gauge resistors 42, 43 disposed on the periphery of the diaphragm 30.

Here, the resistance change of the resistor 41–44 in relation to the thermal stress is substantially in proportion to the resistance of the resistor 41–44. Therefore, it is considered that the resistances RB, RC of the side gauge resistors 42, 43 are set to be smaller than the resistances RA, RD of the center gauge resistors 41, 44 so that the resistance change of the resistors 42, 43 becomes equal to the resistance change of the resistors 41, 44. Thus, the TNO property of the sensor 200 is improved.

Figure 1:
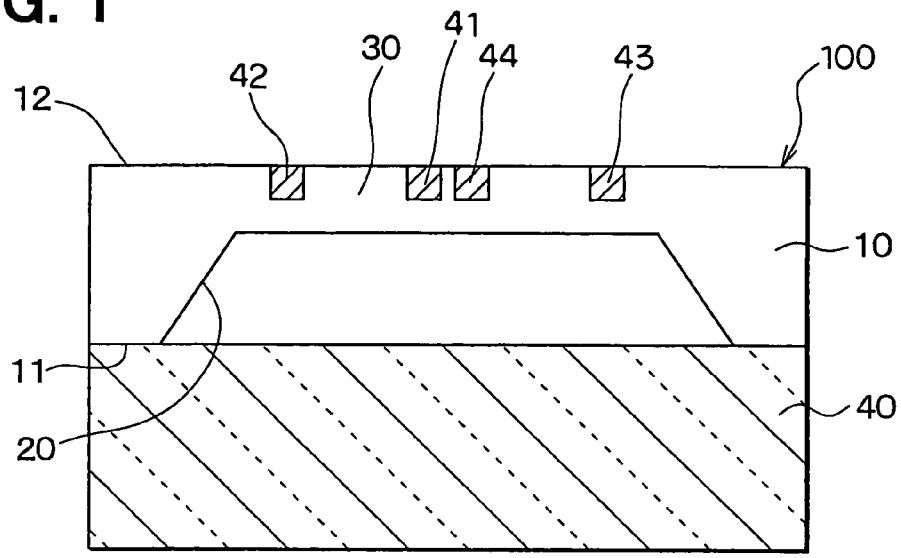
FIG. 1 is a cross-sectional view showing a semiconductor pressure sensor according to a preferred embodiment of the present invention.
Figure 2:
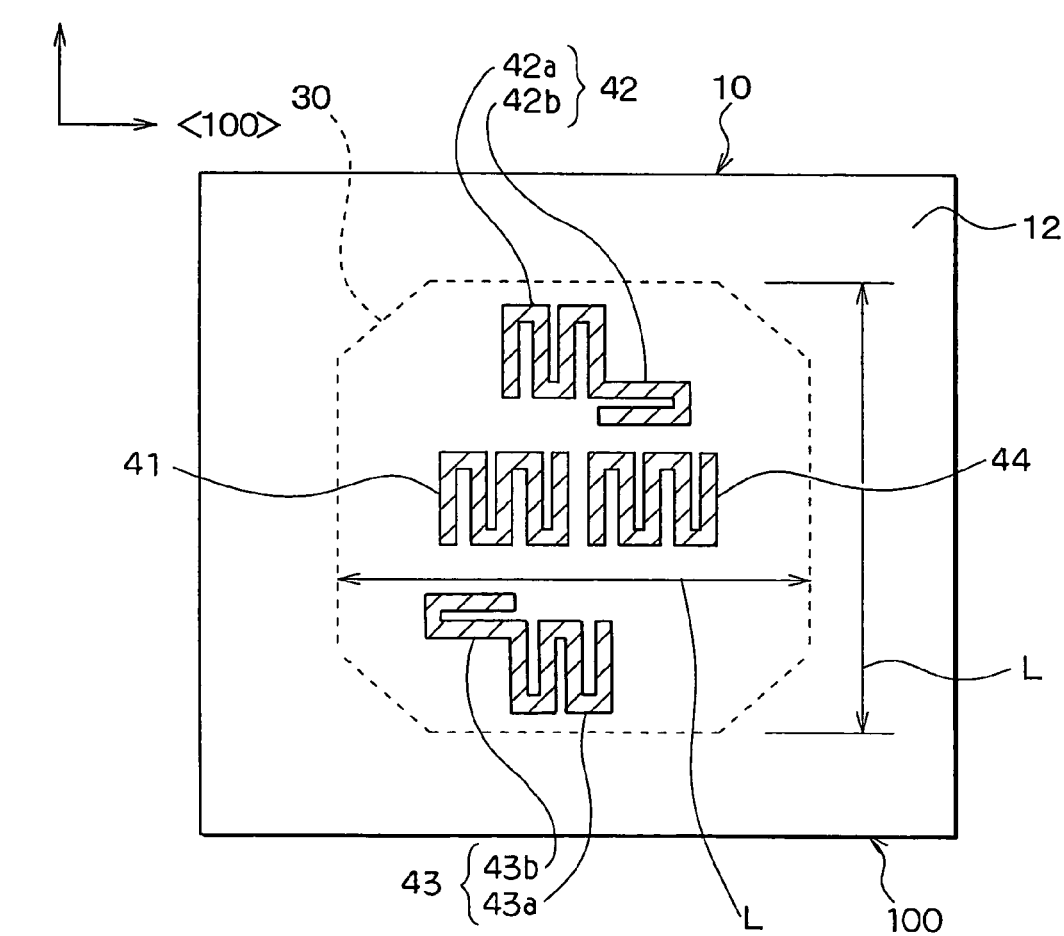
FIG. 2 is a plan view showing the sensor according to the preferred embodiment.

In view of the above analysis, a semiconductor pressure sensor having a diaphragm (i.e., a diaphragm type semiconductor pressure sensor) 100 according to a preferred embodiment of the present invention is formed, as shown in FIGS. 1 and 2. The sensor 100 includes the semiconductor substrate 10, the diaphragm 30, and a glass base 40. The diaphragm 30 is formed on the substrate 10. The substrate 10 is made of single crystalline silicon. A foreside surface 12 of the substrate 10 as a principal plane has the (110) crystal plane (i.e., the (110) plane). A backside surface 11 of the substrate also has the (110) plane. Therefore, both of the principal planes 11, 12 have a planar orientation of (110).

The substrate 10 includes a concavity 20 disposed on the backside surface 11. The concavity 20 provides the diaphragm 30 for detecting a pressure applied thereto. Specifically, part of the substrate 10 disposed on the concavity 20 has a thin portion so that the diaphragm 30 is formed. Multiple resistors 41–44 are disposed on the foreside surface 12 of the thin portion, i.e., on the diaphragm 30.

As shown in FIG. 2, the diaphragm 30 has an octagonal shape. Specifically, the diaphragm 30 has a pair of sides along with the <110> axis and a pair of sides along with the <100> axis. Further, the diaphragm 30 has four sides for connecting between the side along with the <110> axis and the side along with the <100> axis.

The strain gauge resistors 41–44 are formed on the foreside surface 12 of the substrate 10. The strain gauge resistors 41–44 provide the bridge circuit for detecting the distortion of the diaphragm 30 and for outputting a detected signal. The resistors 41–44 are diffused gauge resistors formed with using an implantation method, a diffusion method and the like. The longitudinal direction of each resistor 41–44 is disposed along with the <110> axis of the substrate 10. Specifically, the resistor 41–44 has a folded structure of a wire resistor. The longitudinal direction of the wire resistor is parallel to the <110> direction.

The resistors 41–44 are composed of a pair of the center gauge resistors 41, 44 and a pair of the side gauge resistors 42, 43. The center gauge resistors 41, 44 are disposed on the center of the diaphragm 30, and the side gauge resistors 42, 43 are disposed on the periphery of the diaphragm 30. Each side gauge resistor 42, 43 includes the first gauge resistor 42a, 43a and the second gauge resistor 42b, 43b. The longitudinal direction of the first gauge resistor 42a, 43a is disposed along with the <110> axis, and the longitudinal direction of the second gauge resistor 42b, 43b is disposed along with the <100> axis. The first and second gauge resistors 42a, 42b, 43a, 43b are connected together in series.

Figure 3:
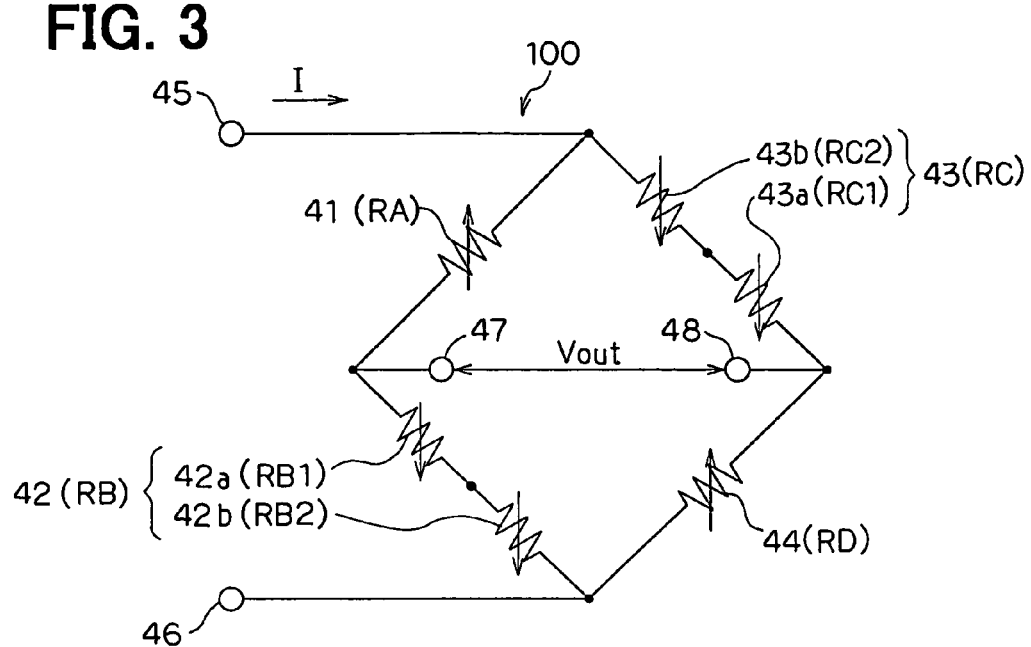
FIG. 3 is a circuit diagram showing a bridge circuit of the sensor according to the preferred embodiment.

The resistors 41–44 connect together with a wire (not shown) formed of a diffused layer and the like so that they 41–44 provide a bridge circuit, as shown in FIG. 3. One of the center gauge resistor 41 has a resistance of RA, and the other center gauge resistor 44 has a resistor of RD. The first gauge resistor 42a of one of the side gauge resistor 42 has a resistance of RB1, and the second resistor 42b of the one of the side gauge resistor 42 has a resistance of RB2. Therefore, the total resistance RB of the one of the side gauge resistor 42 is provided with RB1+RB2. The first gauge resistor 43a of the other side gauge resistor 43 has a resistor of RC1, and the second resistor 43b of the other side gauge resistor 43 has a resistance of RC2. Therefore, the total resistance RC of the other side gauge resistor 43 is provided with RC1+RC2. These resistors 41–44 are connected together in series so that the resistors provide a rectangle-shaped closed circuit. Thus, the wheatstione bridge is provided, so that the stress generated along with the <110> axis is detected by the bridge circuit.

In the side gauge resistors 42, 43, the longitudinal direction of the first gauge resistor 42a, 43a is disposed along with the <110> axis of the substrate 10, so that the first gauge resistor 42a, 43a can detect the stress. Specifically, the first gauge resistor 42a, 43a becomes a stress sensitive gauge resistor, which has sensitivity of the stress, i.e., the stress change. The longitudinal direction of the second gauge resistor 42b, 43b is disposed along with the <100> axis of the substrate 10, so that the second gauge resistor 42b, 43b can not detect the stress substantially. Specifically, the second gauge resistor 42b, 43b becomes a stress non-sensitive gauge resistor, which does not have sensitivity of the stress change substantially.

In the bridge circuit shown in FIG. 3, a pair of input terminals 45, 46 are connected to the bridge circuit so that direct current electricity is applied to the bridge circuit. The direct current I, i.e., the constant direct current I flows between the terminals 45, 46. At this time, when the diaphragm 30 is distorted with the pressure, the resistances RA, RB1, RC1, RD are changed in accordance with the distortion. Therefore, the midpoint potential Vout between a pair of output terminals 47, 48 is generated. The midpoint potential Vout corresponds to the distortion of the diaphragm 30, i.e., the pressure, so that the detected signal as the midpoint potential Vout is outputted from the output terminals 47, 48.

As shown in FIG. 1, in the above sensor 100, the glass base 40 is bonded to the substrate 10 with using the anodic bonding method and the like. Specifically, the glass base 40 is bonded to the backside surface 11 of the substrate 10. In this embodiment, the concavity 20 is sealed with the glass base 40 so that the concavity 20 becomes a reference pressure chamber for providing a reference pressure. Thus, the sensor 100 provides an absolute pressure sensor.

Although the concavity 20 is sealed completely in the sensor 100, the sensor 100 can be another type of pressure sensor, which includes a pressure introduction passage for connecting between the outside and the concavity 20. In this case, pressure as a measurement object is introduced through the passage into the concavity so that the pressure is applied to the diaphragm 30, i.e., the backside surface of the diaphragm 30.

The sensor 100 is manufactured as follows. The substrate 10 having the (110) plane as a principal plane is prepared. Each of the foreside surface 12 and the backside surface 11 of the substrate 10 is the (110) plane. The strain gauge resistors 41–44 and various sorts of wires are formed on the foreside surface 12 of the substrate 10 with using a semiconductor manufacturing method such as the ion implantation method and the diffusion method. Here, the side gauge resistors 42, 43 of the sensor 100 shown in FIG. 2 have different patterns, which is different from those of the sensor 200 shown in FIG. 4. However, it is easy to form the resistors 42, 43 of the sensor 100 shown in FIG. 2 with using a different mask in case of the ion implantation process. Specifically, the mask has a predetermined opening, of which the pattern corresponds to the side gauge resistors 42, 43 having the first and second gauge resistors 42a, 42b, 43a, 43b, respectively.

Then, an etching mask (not shown) for etching the backside surface 11 of the substrate 10 is formed on the backside surface 11. The etching mask includes an opening having a predetermined pattern corresponding to the concavity 20. The etching mask is made of silicon nitride film formed with using the CVD method and the like. After the etching mask is formed on the backside surface 11 of the substrate 10, the backside surface 11 is etched so that the concavity 20 is formed on the substrate 10. Thus, the diaphragm 30 is formed on the foreside surface 12 of the substrate 10. The backside surface 11 is etched with an anisotropic etching method using an alkali etchant (i.e., an etching solution) such as KOH etchant (i.e., potassium hydroxide solution) and TMAH etchant (i.e., terta methyl ammonium hydroxide solution).

Thus, the substrate 10 having the strain gauge resistors 41–44 and the diaphragm 30 is completed. After that, the etching mask is removed with using an etching method and the like. Then, the glass base 40 is bonded to the substrate 10 with using the anodic bonding method and the like.

In the side gauge resistors 42, 43, the first gauge resistor 42a, 43a becomes the stress sensitive gauge resistor, which has sensitivity of the stress change. The second gauge resistor 42b, 43b becomes the stress non-sensitive gauge resistor, which does not have sensitivity of the stress change substantially. Each resistance RB1, RC1 of the first gauge resistors 42a, 43a is set to be smaller than the resistance RA, RD of the center gauge resistors 41, 44. Therefore, the output from the side gauge resistor 42, 43 corresponding to the large thermal stress is almost equalized to the output from the center gauge resistor 41, 44 corresponding to the small thermal stress even when the thermal stress is applied to the side gauge resistor 42, 43, which is larger than that applied to the center gauge resistor 41, 44. That is, the difference between the thermal stress applied to the side gauge resistor 42, 43 and the thermal stress applied to the center gauge resistor 41, 44 is substantially compensated by controlling the resistances RA, RB1, RC1, RD.

For example, a longitudinal side (i.e., a length) L of the diaphragm 30 is equal to a latitudinal side (i.e., a width) L of the diaphragm 30, as shown in FIG. 1. The length L and the width L are 450 $\mu$m, respectively. In this case, the thermal stress σ1 applied to the center gauge resistor 41, 44 is about 70% of the thermal stress σ2 applied to the side gauge resistor 42, 43. This result is obtained by the inventors with using the FEM, as shown in FIG. 6. Therefore, the resistance RB1, RC1 of the first gauge resistor 42a, 43a is set to be 70% of the resistance RA, RD of the center gauge resistor 41, 44. That is, $$RB1=RC1=0.7 \times RA=0.7 \times RD=0.7 \times R, \text{ and}$$

$$RB2=RC2=0.3 \times RA=0.3 \times RD=0.3 \times R.$$

In general, the resistance change of the strain gauge resistor corresponding to the thermal stress is in proportion to the resistance of the resistor. Therefore, the resistance change of the side gauge resistor 42, 43 is almost equalized to that of the center gauge resistor 41, 44, when the thermal stress is applied to the sensor 100.

In general, the resistance of the center gauge resistor is set to be equal to that of the side gauge resistor, so that four resistors composing the bridge circuit are almost the same, so that the offset voltage of the bridge circuit becomes null easily in a case where the pressure is not applied to the sensor (i.e., the applied pressure is null). Therefore, a fine resistance change corresponding to a fine pressure applied to the sensor can be detected.

In this embodiment, the total resistance RB, RC of the side gauge resistor 42, 43, which is composed of the resistance RB1, RC1 of the first gauge resistor 42a, 43a and the resistance RB2, RC2 of the second gauge resistor 42b, 43b, is equal to the resistor RA, RD of the center gauge resistor 41, 44. On the contrary, the total resistance RB, RC of the side gauge resistor 42, 43 is divided into the resistance RB1, RC1 of the first gauge resistor 42a, 43a and the resistance RB2, RC2 of the second gauge resistor 42b, 43b, side. The resistance RB1, RC1 of the first gauge resistor 42a, 43a becomes smaller than the resistor RA, RD of the center gauge resistor 41, 44. Specifically, the total resistance (i.e., 0.7×R+0.3×R) of the side gauge resistor 42, 43 is equal to the resistance (i.e., R) of the center gauge resistor 41, 44. That is, RB1+RB2=RC1+RC2=RA=RD. Therefore, the resistances RA, RB, RC, RD of four resistors 41–44 composing the bridge circuit are substantially the same, i.e., R, so that the offset voltage of the bridge circuit becomes null easily in a case where the pressure is not applied to the sensor (i.e., the applied pressure is null). Therefore, a fine resistance change corresponding to a fine pressure applied to the sensor can be detected. On the contrary, if the sensor 100 does not include the second gauge resistors 42b, 43b, the resistance RB, RC of the side gauge resistor 42, 43 becomes different from the resistance RA, RD of the center gauge resistor 41, 44. Therefore, the offset voltage of the sensor 100 becomes large in a case where the pressure is null, so that the offset voltage is not compensated by a signal processor circuit.

Although the thermal stress σ1 applied to the center gauge resistor 41, 44 is about 70% of the thermal stress σ2 applied to the side gauge resistor 42, 43 in this sensor 100, the ratio of the thermal stress applied between the center gauge resistor 41, 44 and the side gauge resistor 42, 43 may become different if the dimensions of the diaphragm 30, the shape of the diaphragm 30, the dimensions of the resistors 41–44 and/or the shape of the resistors 41–44 become different. Therefore, the ratio of the thermal stress in each sensor having a different diaphragm and/or different strain gauge resistors is necessitated to calculate with using the FEM analysis. That is, it is necessary to calculate the ratio of the resistance RB1, RC1 and the resistance RA, RD with using the FEM analysis in a case where a sensor has a different construction, which is different from that of the sensor 100 shown in FIG. 2.

In the above sensor 100, although the thermal stress σ1 applied to the center gauge resistor 41, 44 is different from the thermal stress σ2 applied to the side gauge resistor 42, 43, the resistance change of the center gauge resistor 41 44 is equalized to the resistance change of the side gauge resistor 42, 43 substantially. Thus, the TNO property of the sensor 100 is improved. Therefore, even when the sensor 100 is minimized, the pressure sensor 100 has high detection accuracy.

Such changes and modifications are to be understood as being within the scope of the present invention as defined by the appended claims.

What is claimed is:

1. A semiconductor pressure sensor comprising:
a semiconductor substrate having a diaphragm for receiving pressure and a bridge circuit for detecting distortion of the diaphragm corresponding to the pressure, wherein the bridge circuit includes a pair of first a pair of second gauge resistors, wherein the first gauge resistors are disposed on a center gauge resistors and of the diaphragm, and the second gauge resistors are disposed on a periphery of wherein the diaphragm, and each first gauge resistor has a first resistance, which is larger than a second resistance of each second gauge resistor,
wherein the bridge circuit has a predetermined ratio of resistance between the second resistance and the first resistance,
wherein the diaphragm has another predetermined ratio of thermal stress between a second thermal stress to be applied to the second gauge resistor and a first thermal stress to be applied to the first gauge resistor in a case where a thermal stress is applied to the substrate, and wherein the predetermined ratio of resistance is equal to the predetermined ratio of thermal stress.

2. The sensor according to claim 1, wherein both of the thermal stresses to be applied to the first gauge resistor and the second gauge resistor are determined with using a finite element method so that the predetermined ratio of thermal stress is obtained.

3. The sensor according to claim 1, wherein the first gauge resistors and the second gauge resistors are connected together in series so that the bridge circuit provides a wheatstone bridge, wherein each second gauge resistor further includes a third gauge resistor having a third resistance and disposed on the periphery of the diaphragm, wherein the second and third gauge resistors are integrally connected in series so that the second and third gauge resistors provide one gauge resistor, and wherein the first resistance is equal to a total resistance of the second and third resistances.

4. The sensor according to claim 3, wherein the semiconductor substrate is made of single crystal silicon having a principal plane of a (110) crystal plane, wherein the first gauge resistor has a longitudinal direction along with a <110> crystal axis of the single crystal silicon, wherein the second gauge resistor has a longitudinal direction along with the <110> crystal axis of the single crystal silicon, and wherein the third gauge resistor has a longitudinal direction along with a <100> crystal axis of the single crystal silicon.

5. The sensor according to claim 4, wherein each gauge resistor has a folded structure of a wire resistor so that the wire resistor is parallel to the <110> crystal axis or the <100> crystal axis, and wherein the diaphragm has an octagonal shape having a pair of sides along with the <110> crystal axis, a pair of sides along with the <100> crystal axis, and four sides for connecting between the side along with the <110> crystal axis and the side along with the <100> crystal axis.

6. The sensor according to claim 5, wherein the diaphragm has a length of 450 $\mu$m and a width of 450 $\mu$m, and wherein the predetermined ratio of resistance is 0.7.

7. The sensor according to claim 1, further comprising:

a concavity disposed in the substrate so as to provide the diaphragm; and a glass base disposed on the substrate, wherein the substrate includes a first surface and a second surface, wherein the gauge resistors are disposed on the first surface of the substrate, and wherein the glass base is attached to the second surface of the substrate so as to provide a chamber between the glass base and the concavity.

8. The sensor according to claim 7, wherein the chamber is sealed so that the sensor provides an absolute pressure sensor, and wherein the gauge resistors are strain gauge resistors made of diffused resistor.

9. The sensor according to claim 8, wherein the bridge circuit has a predetermined ratio of resistance between the second resistance and the first resistance, wherein the diaphragm has another predetermined ratio of thermal stress between a second thermal stress to be applied to the second gauge resistor and a first thermal stress to be applied to the first gauge resistor in a case where a thermal stress is applied to the substrate, and wherein the predetermined ratio of resistance is equal to the predetermined ratio of thermal stress so that a temperature nonlinearity offset property of the sensor is improved.

10. The sensor according to claim 9, wherein the first gauge resistors and the second gauge resistors are connected together in series so that the bridge circuit provides a wheatstone bridge, wherein each second gauge resistor further includes a third gauge resistor having a third resistance and disposed on the periphery of the diaphragm, wherein the second and third gauge resistors are integrally connected in series so that the second and third gauge resistors provide one gauge resistor, and wherein the first resistance is equal to a total resistance of the second and third resistances.

11. The sensor according to claim 10, wherein the semiconductor substrate is made of single crystal silicon having a principal plane of a (110) crystal plane, wherein the first gauge resistor has a longitudinal direction along with a <110> crystal axis of the single crystal silicon, wherein the second gauge resistor has a longitudinal direction along with the <110> crystal axis of the single crystal silicon, and wherein the third gauge resistor has a longitudinal direction along with a <100> crystal axis of the single crystal silicon.

12. The sensor according to claim 11, wherein each gauge resistor has a folded structure of a wire resistor so that the wire resistor is parallel to the <110> crystal axis or the <100> crystal axis, and wherein the diaphragm has an octagonal shape having a pair of sides along with the <110> crystal axis, a pair of sides along with the <100> crystal axis, and four sides for connecting between the side along with the <110> crystal axis and the side along with the <100> crystal axis.

* * * * *